UNITED STATES PATENT OFFICE.

ALBRECHT SCHMIDT AND KARL THIESS, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

PENTABROMINDIGO.

1,070,541.  Specification of Letters Patent.  Patented Aug. 19, 1913.

No Drawing. Application filed July 8, 1908. Serial No. 442,625.

*To all whom it may concern:*

Be it known that we, ALBRECHT SCHMIDT, Ph. D., and KARL THIESS, Ph. D., citizens of the Empire of Germany, residing at Höchst-on-the-Main, Hesse-Nassau, Prussia, Germany, have invented certain new and useful Improvements in Pentabromindigo, of which the following is a specification.

If indigo or a brominated indigo, such as mono-, di-, tri- or tetra-bromindigo, as treated at raised temperature with an excess of bromin, for instance is heated with liquid bromin under pressure, or is heated with an excess of bromin plus concentrated sulfuric acid, a product is obtained which, when washed with bisulfite or with alcohol, yields penta-bromindigo; this product being obtained in a particularly easy manner, if halogen carriers such as iodin are added. The structural formula of the new pentabromindigo is very likely as follows:

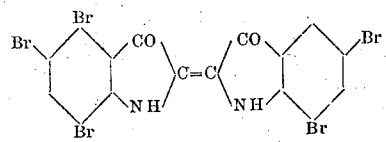

This pentabromindigo dyes in the vat a blue of a considerably more greenish tint than tetrabromindigo, which fact is particularly well perceivable in artificial light.

Example I: 26 parts by weight of indigo are stirred, while being well cooled, in 260 parts of bromin, and the mixture is gently and gradually heated while stirring, and then the heating is continued, under pressure, for some hours, up to 80° C. Then the excess of bromin is removed by means of a current of air or by washing with carbon tetrachlorid, and the remaining greenish black mass, which substantially consists of a perbromid of a pentabrominated indigo, is heated with a solution of bisulfite, filtered and washed with hot water. The pentabromindigo thus obtained forms a dark blue powder, $C_{16}H_5N_2O_2Br_5$, containing 59.81% (theoretically 60.88%) of bromin. This product dissolves in concentrated sulfuric acid with a pure blue color, and in cold anilin with a blue color, thereby being distinguished from tetrabromindigo which dissolves with a greenish hue. It is also much more readily soluble in organic solvents than tri- and tetrabromindigo, and when oxidized, for instance by means of nitric acid in presence of glacial acetic acid, it yields a mixture of 4-5.7-tribromisatin melting at 257° C. and 5.7-di-bromisatin melting at 249°–250° C. whereas the pentabromindigo described in British Patent No. 10326/07 yields on oxidation a mixture of a di- and tribromisatin each containing one bromin-atom in m (6) position to the NH group. This pentabromindigo dyes in the vat a considerably more greenish blue than the tetrabromindigo, and the pentabromindigo described in British Patent No. 10,326 of 1907, which fact is particularly recognizable in artificial light.

Example II: 21 parts by weight of dibromindigo containing for instance 36.6% bromin are introduced, while well cooling, into 180 parts of bromin, in which 1–2 parts of iodin may be dissolved to advantage, and the mixture is heated for some hours, under pressure, up to 80° C. The procedure for finishing the product is as per Example I. The pentabrominated indigo thus obtained contains 60.04% of bromin and shows the same properties as the dyestuff obtained as per Example I.

Example III: 42 parts by weight of dibromindigo containing for instance 38% of bromin are stirred in about 252 parts of concentrated sulfuric acid of 66° Bé. Then about 150 parts of bromin, in which 2 parts of iodin may be dissolved to advantage, are added while cooling. The mixture is heated for some hours in the reflux cooling apparatus up to 70–80° C. After finishing the bromination the excess of bromin is expelled by distillation or by means of a current of air. The greenish-black mass substantially consists of a perbromid of a pentabrominated indigo. To obtain therefrom pentabromindigo, the mass is pressed on bisulfite and ice, filtered off and washed with water. The pentabrominated indigo thus obtained contains 59.88% of bromin and shows the same properties as the dyestuff obtained as per Example I.

In general it is sufficient and necessary that indigo, or its bromsubstitution products obtained by brominating indigo, be treated, preferably while heating, with an excess of bromin of at least one atom of bromin above that quantity of bromin which is required for the pentahalogenation.

Having now described our invention, what we claim is:

As a new product, pentabromindigo of the structural formula:

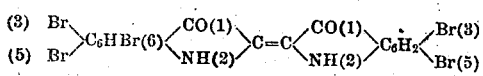

being a dark-blue powder, soluble in concentrated sulfuric acid with a blue color and in cold anilin also with a blue color, much more readily soluble in organic solvents than tri- and tetrabromindigo; yielding on oxidation, by means of nitric acid in glacial acetic acid, a mixture of 4.5.7-tri- and 5.7-di-bromisatin.

In testimony whereof, we affix our signatures in presence of two witnesses.

ALBRECHT SCHMIDT.
KARL THIESS.

Witnesses:
  JEAN GRUND,
  CARL GRUND.